(12) United States Patent
Froehlich et al.

(10) Patent No.: US 6,184,470 B1
(45) Date of Patent: Feb. 6, 2001

(54) SEAL INSERT FOR CABLE FITTINGS

(75) Inventors: Franz Froehlich, Hagen; Rainer Zimmer, Schalksmuehle, both of (DE)

(73) Assignee: RXS Kabelgarnituren GmbH, Hagen (DE)

( * ) Notice: Under 35 U.S.C. 154(b), the term of this patent shall be extended for 0 days.

(21) Appl. No.: 09/441,906

(22) Filed: Nov. 17, 1999

(30) Foreign Application Priority Data

Nov. 18, 1998 (DE) ................................................ 198 53 204

(51) Int. Cl.$^7$ ..................................................... H02G 15/04
(52) U.S. Cl. ........................................ 174/77 R; 174/65 G
(58) Field of Search ............................. 174/77 R, 65 G, 174/152 G, 153 G, 91, 92

(56) References Cited

U.S. PATENT DOCUMENTS

| | | | |
|---|---|---|---|
| 4,179,319 | * 12/1979 | Lofdahl | 174/77 R X |
| 4,216,351 | * 8/1980 | Brandeau | 174/92 |
| 4,654,473 | * 3/1987 | Roux et al. | 174/77 R X |
| 4,808,772 | * 2/1989 | Pichler et al. | 174/92 |
| 5,545,851 | 8/1996 | Meltsch et al. | 174/74 R |
| 5,979,902 | * 11/1999 | Chang et al. | 277/316 |
| 6,107,574 | * 8/2000 | Chang et al. | 174/77 R |

FOREIGN PATENT DOCUMENTS

| | | |
|---|---|---|
| 0 443 118 | 1/1995 | (EP). |
| 0 652 619 | 5/1995 | (EP). |

* cited by examiner

Primary Examiner—Kristine Kincaid
Assistant Examiner—Chau N. Nguyen
(74) Attorney, Agent, or Firm—Schiff Hardin & Waite

(57) ABSTRACT

A seal insert with a rectangular cross-section is made of elastic plastic material to form seals between a seal body and a circumferential cable sleeve body. The seal insert has a longitudinally extending cavity in the center of the insert and longitudinal channels in each of the corner regions of the seal insert that extend parallel to the cavity.

16 Claims, 2 Drawing Sheets

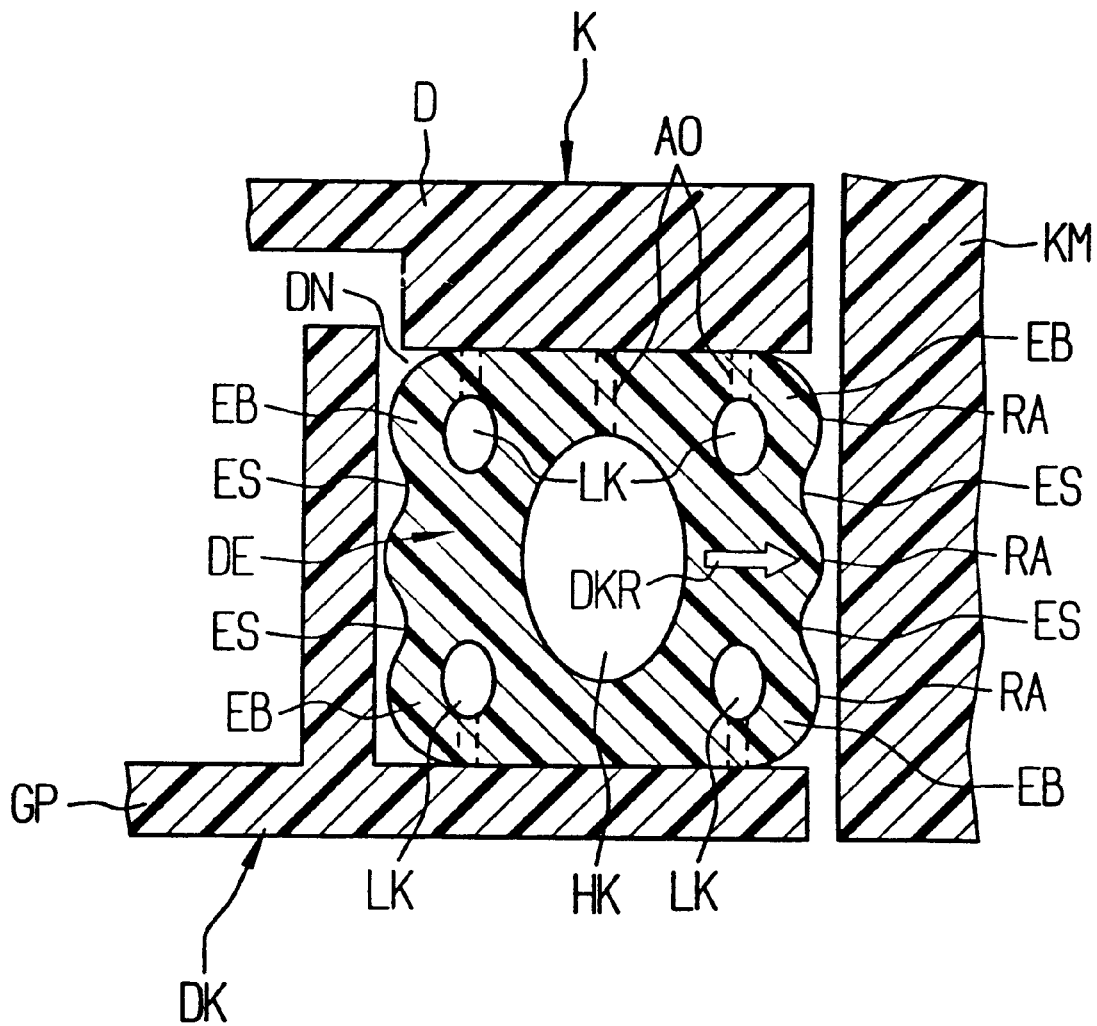

SEAL INSERT FOR CABLE FITTINGS

BACKGROUND OF THE INVENTION

The present invention is directed to a seal insert with a rectangular cross-section made of an elastic plastic material for seals between a seal body and a cable sleeve body.

U.S. Pat. No. 5,545,851, which claims priority from the same German Application as EP 0 652 619-B1, discloses a cable sleeve wherein the cable system is arranged circumferentially at the seal body. This seal system comprises a seal channel, which can be reduced in volume, and a seal ring that is inserted into the seat channel. The seal channel is reduced in volume by applying force on a movable channel wall, which movable wall presses the inserted seal ring in a direction offset by 90° relative to the force applied and into the surrounding sleeve wall. In this case, the seal insert is formed entirely of an elastic material and is deformed accordingly and, thus, seals circumferentially. In the deformation of the compact seal material, however, a precise adjusting is necessary in order to achieve clear seal conditions.

EP 0 443 118-B1 discloses a tube seal with a tubular cross-section for sealing in seal channels of cable fittings, wherein a cavity of the tube proceeds in the interior. This serves the purpose of being able to fashion a softer seal. However, this potentially leads to these seal inserts forming an oval and tending to collapse when pressed together. Therefore, pressure against the sealing surfaces cannot be built up. Besides, such circular tube seals only form a seal which lies in a narrow region along a generated line of the seal insert or, respectively, of a seating line of the seal surface.

SUMMARY OF THE INVENTION

The present invention is based on the object of creating a seal insert that shows sufficient flexibility and still exhibits a relatively good stability. It must be possible to insert this seal insert into a sealing system in which the conversion of an axially acting closing force occurs 90° to a sealing force acting radially on a sealing surface. The object is inventively achieved with a seal insert in which at least one rib-shaped portion respectively proceeds between two corner regions of a rectangular cross-section along the outside wall of the seal insert. A cavity proceeds longitudinally in the center of the seal insert and longitudinal channels are also arranged in each corner region of the seal insert so that the longitudinal channels proceed parallel to the longitudinal cavity. Preferably, the seal insert is a continuous annular ring insert.

Sleeves and similar receptacles made of plastic exhibit a high expansion factor, which is particularly obvious when the temperature changes. Thus, high requirements are set for the seal inserts of such receptacles regarding the flexibility and adjustment given temperature changes. Therefore, they must be very elastic in order to compensate and overcome the expansion fluctuations of the involved components. They must also show a high restoring behavior at low temperatures and must still exert sufficient seal forces in the most disadvantageous conditions. In previous plastic cable fittings, elastic seals made of rubber or silicon have been used, for example, which have a cross-section of an annulus or a circular disc. It is disadvantageous here that these seal inserts with a circular ring profile are respectively situated adjacent only along a generating line of the seal insert at the surface that is to be sealed. A further disadvantage of such seal inserts is that they form an oval when pressed together and tend to collapse. Therefore, pressure is no longer built up against the seal surfaces and the seal becomes defective.

The inventive seal insert comprises a rectangular cross-section, an inner cavity proceeding longitudinally in the insert and additional longitudinal channels extending parallel to the large, centrally proceeding cavity. This seal insert meets the given requirements and, in connection with the rib-shaped portions that proceed longitudinally, is especially appropriate for sealing in seal systems given cable fittings made of plastic.. Besides, the inventive seal insert is especially appropriate for applications wherein the closing force exerted on the seal insert that is inserted into a seal channel acts offset 90° on the adjacent sealing surface, for example as in the given case of cable sleeves. The inventive seal insert is approximately rectangular and preferably square, so that the sealing surface is substantially larger relative to the sealing surface compared to a seal formed of a circular cross-section. The outside press surfaces of the seal insert, however, are provided with rib-shaped portions that proceed longitudinally. These rib-shaped portions multiply the contact pressure surface relative to the sealing surface as compared to a circular profile and prevent transverse inclusions, which may lead to leaks. Preferably, the interior proceeding cavity is also of an oval cross-section, whereby the larger axis of the oval extends in the direction on which the closing force is applied. Thus, the acting closing force is diagonally deflected to the sides and acts more uniformly on the adjacent seating sealing surfaces. Further, smaller longitudinal channels are arranged in the comer regions of the seal insert to extend parallel to the inner cavity. Thus, a sufficient stroke is provided in the corner regions of the seal insert. Moreover, the rigidity of the seal insert is thereby reduced, so that the necessary contact pressure forces can be reduced given the same sealing effect.

In a further development of the inventive seal insert, holes are respectively introduced in the longitudinally extending cavity and/or the longitudinal channels so that the interior stands in connection with the outside environment. This solves the problem of different temperature responses in the outer and inner regions of the seal insert. Tension between the individual sleeve parts, which can have a damaging effect on the sealing conditions, have, in certain instances, resulted due to the chronologically differing temperature characteristics given outside temperature fluctuations up to the inner regions of the seal insert. Thus, for example, given an outside cooling, the outer sleeve shell contracts, whereby the temperature in the interior of the seal insert is still higher so that in a closed state, an extremely high pressure occurs in the interior of the seal insert. This high pressure leads to the permeation of the air to the outside. Given a later heating, the sleeve shell expands again, whereby air in the seal insert is still cold and is also reduced by the previous permeation. This results in a leak during the temperature change that can ultimately lead to a failure of the seal. This process becomes especially obvious when a foam material is used for the seal insert, since the permeation of air then also takes place in the individual pores. Due to the invention of holes in the longitudinally extending cavity or the longitudinal channels, a corresponding air flow occurs to the outside environment so that the cited defects cannot arise. The inventive seal insert is explained in greater detail below with the aid of the Figures.

BRIEF DESCRIPTION OF THE DRAWINGS

FIG. 3 is a transverse cross-section of an embodiment of the inventive seal insert in a sealing system.

DESCRIPTION OF THE PREFERRED EMBODIMENT

Figure 1:
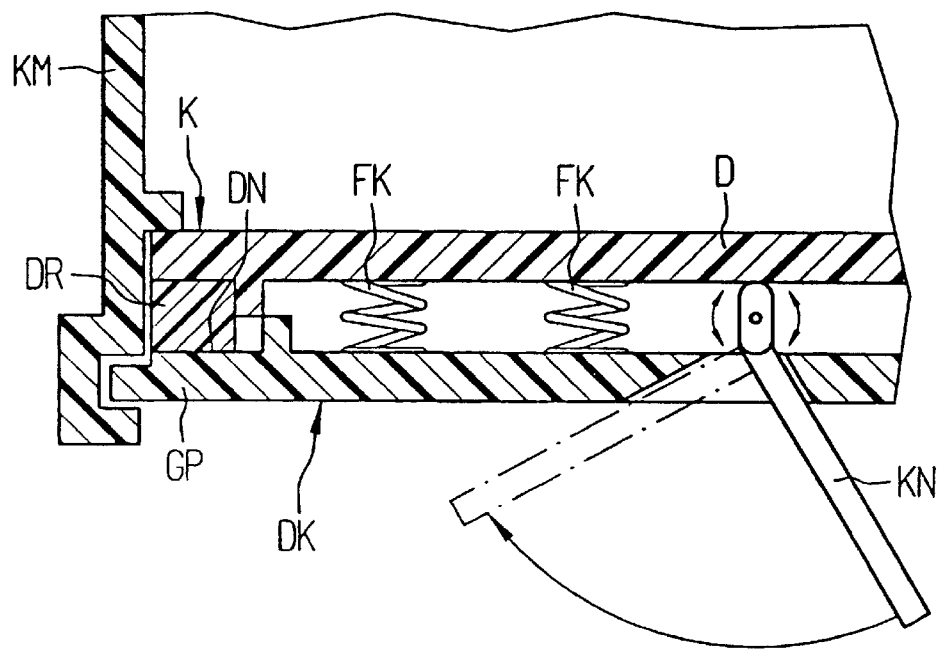
FIG. 1 is a partial transverse cross-section of a known seal insert made of a solid material with a rectangular cross-section, which seal insert is being pressed against an outer sleeve wall given a change of a channel volume.

FIG. 1 is an exemplary embodiment according to the prior art. This concerns a cable sleeve KM that is closed with a sealing body DK at the end face. This sealing body DK comprises a base plate GP and is a movably arranged pressure unit that is situated above this base plate GP. A circumferential seal channel DN is formed at the circumferential margin of the seal body DK so that a seal channel volume can be changed by the movable pressure unit D. Given the closing of the cable sleeve KM, the pressure unit D is moved onto the introduced seal ring DR that is made of an elastic solid material with the aid of a toggle KN in opposition to the tension forces of the tension springs FK. Thus, the corresponding force K acts on the seal ring DR due to a reduction of the seal volume. The seal ring DR is pressed against the surrounding inner sleeve wall of the cable sleeve KM and expands radially outward 90° to the acting force K to cause a sealing. The system of FIG. 1 is described in greater detail in the above-mentioned U.S. Pat. No. 5,545,851, whose disclosure is incorporated herein by reference thereto.

Figure 2:
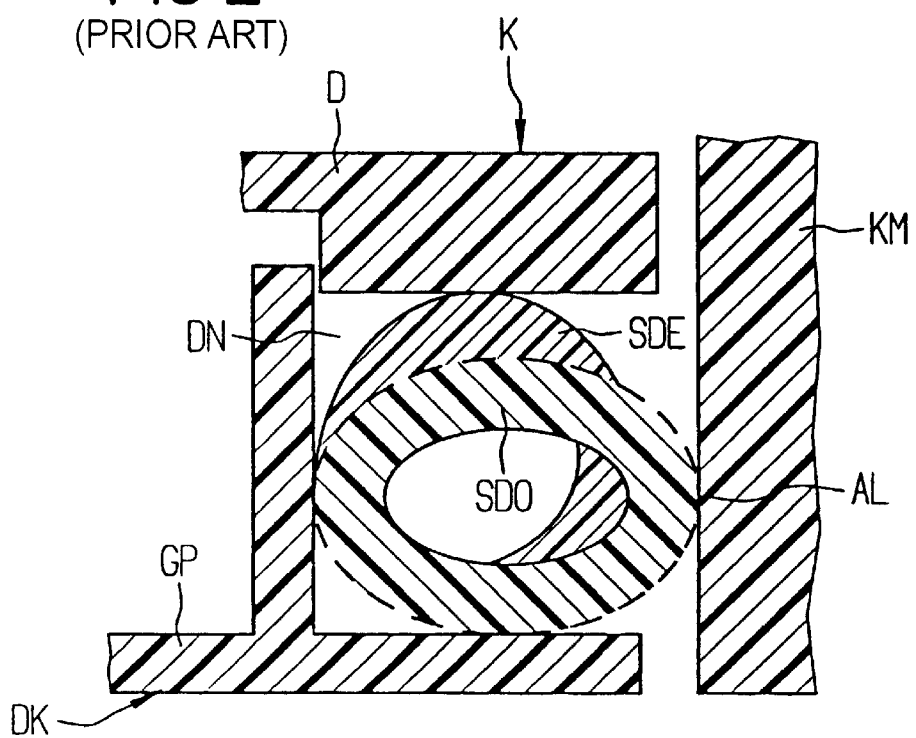
FIG. 2 is a partial cross-sectional view of a seal insert of a circular cross-section.

FIG. 2 illustrates a section of the seal system already described in FIG. 1 with the base plate GP, the pressure unit or plate D and the seal channel DN, wherein the previously common tubular seal insert SDE with an initially circular cross-section is used. In the sealed case, i.e., when the seal volume of the seal channel is reduced by the acting force K, the inserted tubular seal insert SDE deforms into an oval cross-section insert SDO, as illustrated in broken line, so that the seal insert SDO is pressed along a seating line AL onto the inner sleeve wall of a cable sleeve AM. However, this pressing region is very narrow and easily susceptible to disturbing influences. Besides, there is a danger that the oval, tubular seal insert SDO, which is formed by the pressure applied on the tubular seal SDE, will completely collapse, so that no seal pressure will be applied.

A seal insert DE of the present invention is shown in cross-section in FIG. 3. The same seal system as in the above-discussed prior art is used and this insert is shown as being inserted in the sealing channel DN. The seal channel DN with an adjustable seal channel volume is used, wherein the closing force K acts, again, against a pressure unit or plate D on the seal insert DE. The inventive seal insert is inserted into the seal channel DN and the insert is of a rectangular cross-section and, in this case, even of a square cross-section. In order to improve the sealing and, therefore, the seal to the inner wall of the cable sleeve KM, at least one rib-shaped portion RA is arranged between the two corner regions EB along a generating line of the seal insert DE. In this exemplary embodiment, three rib-shaped portions RA proceed between two corner regions EB on the two opposite seating sides of the seal insert DE. Between the rib-shaped portions RA that are seen in cross-section, hollows ES are provided that proceed longitudinally and form a corrugated surface with the ribs RA. Thus, the seal insert DE is situated adjacent along several seating lines with correspondingly compensating hollows ES that lie in between and adjacent to the seal surface of the inner wall of the cable sleeve KM. The seal insert SE has a cavity HK that proceeds longitudinally therein, which is arranged within the center of the seal insert and also has longitudinal channels LK which are arranged in the corner regions EB. The cavity HK and the longitudinal channels LK can comprise circular cross-sections or can advantageously, as shown, comprise an oval cross-section with the major or long axis proceeding in the direction of the acting closing force K with the result that the tendency of the seal insert to collapse is substantially smaller compared to circular cross-sections. Besides, a more uniform transfer and pressure distribution in the direction of the acting seal force DKR onto the circumferential inner cable sleeve wall of the cable sleeve KM will occur. In this embodiment, all variations of the invention are combined; however, individual measures, such as only one cavity or only one rib-shaped portion for the present instance of the application can be sufficient. It is also expedient to round-off the corners of the seal insert that proceed longitudinally in order to prevent a crimping of the corners.

In addition, FIG. 3 indicates that the longitudinal channels LK, as well as the cavity HK that proceeds parallel to each other, are provided with holes forming compensating openings AO, via which the corresponding pressure compensation can occur. Thus, the abovedescribed problems regarding the permeation and the temperature curves are overcome. This is especially important if an endless or annular ring is used as a sealing insert.

Although various minor modifications may be suggested by those versed in the art, it should be understood that we wish to embody within the scope of the patent granted hereon all such modifications as reasonably and properly come within the scope of our contribution to the art.

We claim:

1. A seal insert comprising a rectangular cross-section made of an elastic material for forming a seal between a seal body and a cable sleeve body having an inner sleeve wall, said insert having an outer wall facing the inner sleeve wall and at least one rib-shaped portion proceeding between two corner regions of said rectangular cross-section along the outer wall of the seal insert, a longitudinally extending cavity proceeding within the center of the seal insert and longitudinal channels being arranged in each corner region of the seal insert, said longitudinal channels proceeding parallel to the cavity.

2. A seal insert according to claim 1, wherein the rectangular cross-section is a square.

3. A seal insert according to claim 1, wherein the corner regions of the seal insert are longitudinally rounded-off.

4. A seal insert according to claim 1, wherein the cavity and the longitudinal channels exhibit circular cross-sections.

5. A seal insert according to claim 1, wherein the cavity and the longitudinal channels exhibit oval cross-sections, wherein the long axis of the oval proceeds in the direction of an acting closing force.

6. A seal insert according to claim 1, wherein the cross-section of the cavity is larger than the cross-section of each of the longitudinal channels.

7. A seal insert according to claim 1, wherein said at least one rib-shaped portion comprises several rib-shaped portions which are arranged in the outer wall of the seal insert and have hollows fashioned between the rib-shaped portions to form a corrugated surface for the outer wall.

8. A seal insert according to claim 7, which has additional several rib-shaped portions on a wall opposite the outer wall with hollows extending between the rib-shaped portions to provide each of the walls with a corrugated surface.

9. A seal insert according to claim 8, wherein the several rib-shaped portions comprise two rib-shaped portions on each of the walls.

10. A seal insert according to claim 8, wherein the cavity and the longitudinal channels each has an opening extending to an outer surface of the seal insert so that air pressure in the channels and cavity is compensated due to changes in the ambient temperatures.

11. A seal insert according to claim 1, wherein the elastic material is rubber.

12. A seal insert according to claim 1, wherein the elastic material is silicon.

13. A seal insert according to claim 1, wherein the elastic material is a foam material.

14. A seal insert according to claim 1, wherein the seal insert is fashioned as an endless ring.

15. A seal insert according to claim 1, wherein the cavity and the longitudinal channels each has a hole or opening to the outside.

16. A seal insert according to claim 1, wherein the seal insert is arranged in a circumferential seal channel of said seal body for said cable sleeve body, said seal insert being radially pressed onto the surrounding inner wall of the cable sleeve body due to a reduction of the seal channel volume that is due to an axially acting closing force.

* * * * *